(12) United States Patent
Blattert et al.

(10) Patent No.: US 10,427,659 B2
(45) Date of Patent: Oct. 1, 2019

(54) METHOD AND DEVICE FOR OPERATING A BRAKING SYSTEM OF A MOTOR VEHICLE, BRAKING SYSTEM

(71) Applicant: Robert Bosch GmbH, Stuttgart (DE)

(72) Inventors: Dieter Blattert, Kirchheim/Neckar (DE); Edith Mannherz, Weinsberg (DE); Helmut Wolff, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/699,819

(22) Filed: Sep. 8, 2017

(65) Prior Publication Data

US 2018/0126969 A1    May 10, 2018

(30) Foreign Application Priority Data

Nov. 10, 2016  (DE) .................. 10 2016 222 045

(51) Int. Cl.
| | | |
|---|---|---|
| *B60T 8/44* | (2006.01) | |
| *B60T 8/172* | (2006.01) | |
| *B60T 13/74* | (2006.01) | |
| *B60T 8/32* | (2006.01) | |
| *B60T 13/68* | (2006.01) | |
| *B60T 15/04* | (2006.01) | |
| *B60T 8/48* | (2006.01) | |

(52) U.S. Cl.
CPC .............. *B60T 8/447* (2013.01); *B60T 8/172* (2013.01); *B60T 8/32* (2013.01); *B60T 8/3265* (2013.01); *B60T 13/686* (2013.01); *B60T 13/741* (2013.01); *B60T 13/745* (2013.01); *B60T 15/041* (2013.01); *B60T 8/4872* (2013.01); *B60T 2201/06* (2013.01)

(58) Field of Classification Search
CPC ... B60T 8/44; B60T 8/447; B60T 8/32; B60T 8/326; B60T 8/3265; B60T 13/68; B60T 13/686; B60T 13/74; B60T 13/741; B60T 13/745; B60T 15/041
USPC ..................... 303/20, 191, 192, 114.1, 114.2
See application file for complete search history.

(56) References Cited

U.S. PATENT DOCUMENTS

| | | | |
|---|---|---|---|
| 7,325,887 B2 * | 2/2008 | McCann | B60T 1/005 188/72.9 |
| 7,850,255 B2 * | 12/2010 | Kawahara | B60T 7/12 303/122.1 |

(Continued)

FOREIGN PATENT DOCUMENTS

| | | |
|---|---|---|
| DE | 199 50 029 A1 | 4/2001 |
| DE | 10 2009 000 769 A1 | 8/2010 |
| JP | 2005238960 A * | 9/2005 |

*Primary Examiner* — Thomas J Williams
(74) *Attorney, Agent, or Firm* — Maginot, Moore & Beck LLP

(57) ABSTRACT

A method for operating a braking system of a motor vehicle with at least one hydraulically actuable wheel brake, a brake actuation device for hydraulically actuating the wheel brake, an electric brake booster for setting a predefinable hydraulic braking boost, and at least one parking brake assembly includes monitoring the motor vehicle to detect standstill and monitoring the parking brake assembly to detect activation thereof. The method further includes reducing a braking boost set by the brake booster if standstill of the motor vehicle has been detected and an activation of the parking brake assembly has been detected.

9 Claims, 3 Drawing Sheets

(56) References Cited

U.S. PATENT DOCUMENTS

2012/0161507 A1\* 6/2012 Vollert ................. B60T 8/32
                                                    303/114.1
2013/0138316 A1\* 5/2013 Koyama ............... B60T 8/32
                                                    701/70

\* cited by examiner

METHOD AND DEVICE FOR OPERATING A BRAKING SYSTEM OF A MOTOR VEHICLE, BRAKING SYSTEM This application claims priority under 35 U.S.C. § 119 to patent application no. DE 10 2016 222 045.4, filed on Nov. 10, 2016 in Germany, the disclosure of which is incorporated herein by reference in its entirety.

BACKGROUND

The disclosure relates to a method for operating a braking system of a motor vehicle, wherein the braking system comprises at least one hydraulically actuable wheel brake, a brake actuation device for hydraulically actuating the wheel brake, an electric brake booster for setting a predefinable hydraulic braking boost and at least one parking brake assembly associated, in particular, with the respective wheel brake.

The disclosure further relates to a device for operating a braking system which carries out the above-described method, and a corresponding braking system having such a device.

Methods, devices and braking systems of the type mentioned in the introduction are known from the prior art. Conventional braking systems in motor vehicles operate hydraulically a driver generating a hydraulic pressure by actuating a brake actuation device, in particular a brake pedal, which pressure is generated, in particular, by means of a brake master cylinder and is transmitted by means of a plurality of valves to one or more wheel brakes of the motor vehicle. With valves switched appropriately, the hydraulic pressure acts on a brake piston of the respective wheel brake in order to displace said brake piston to generate a clamping force between brake linings and brake disk. To assist the driver it is also known to provide a brake booster which makes available a braking boost in dependence on the actuating force exerted on the brake pedal by the driver, which boost raises the hydraulic pressure beyond that which the driver introduces into the braking system solely by actuating the brake pedal. High braking forces can thereby be generated, even if the driver is able to exert only a low braking or actuating force. Such a brake booster is usually in the form of a vacuum brake booster, as disclosed, for example, in the unexamined patent application DE 199 50 029 A1.

However, systems are known by now in which the brake booster is in the form of an electric brake booster. Such a braking system is disclosed, for example, in the unexamined patent application DE 10 2009 000 769 A1. In this case the braking boost is set independently of the actual actuation of the brake pedal by activation of an electric actuator of the brake booster. In addition, it is known from the aforementioned document to change the hydraulic braking boost made available by the brake booster in dependence on an operating situation of the motor vehicle.

It is also known to associate a parking brake assembly with the respective wheel brake. In particular, it is known to integrate the parking brake assembly into the wheel brake in such a way that the parking brake assembly has a separate actuator which nevertheless acts directly or indirectly on the elements of the wheel brake already present, such as, in particular, brake pistons, brake pads and brake disk. A distinction must therefore be made between a service brake, which is activated hydraulically by the driver by means of the brake actuation device and if applicable by the brake booster, and the parking brake assembly which is integrated in the service brake assembly.

SUMMARY

The method according to the disclosure has the advantage of ensuring an energy saving and a protection of components with the parking brake assembly activated. The disclosure therefore has the advantage that a component protection and an energy saving is effected in an automated manner in dependence on the actuation of the parking brake assembly. By taking account of the operating state or actuation state of the parking brake assembly, it is determined in an especially simple manner whether a further actuation of the brake actuation device by the driver is to be expected. It is assumed that as soon as the parking brake assembly is activated a further brake actuation by the driver, that is, an actuation of the service brake, will not occur. As soon as the parking brake assembly is actuated, it is preferably assumed that the vehicle is at standstill and that therefore no further braking operations of the service brake are currently necessary. In this situation, according to the disclosure, the hydraulic braking boost is reduced, so that although the hydraulic pressure in the braking system is increased when the driver actuates the brake pedal, the increase does not exceed that which the driver himself feeds into the system by actuating the brake pedal. In that case the driver is no longer assisted by the brake booster when actuating the brake pedal, whereby the pedal resistance is increased and the driver presses on a "hard brake pedal". Because the hydraulic pressure in the hydraulic portion of the braking system can then be increased only by the braking force exerted by the driver, the stress on the components carrying the hydraulic medium is reduced. In addition, through the reduction of the braking boost, the electrical energy required by the brake booster is reduced, so that the above-mentioned energy saving is achieved. For the driver, the behavior of the motor vehicle or of the braking system then corresponds to the behavior of a braking system with a vacuum brake booster. The driver would now encounter a "hard brake pedal" if he again operated the brake pedal. This therefore additionally leads to an improvement of the braking system in terms of driver comfort, since the driver experiences the reaction of the brake pedal to which he is accustomed. According to the disclosure, this is achieved in that in a first step a) the motor vehicle is monitored to detect standstill. Here, in particular the actual speed of the motor vehicle is monitored and then, if the vehicle speed is zero or close to zero, for example <3 km/h, standstill of the vehicle is registered. Alternatively or additionally, the operating state of the parking brake assembly is preferably monitored. If it is determined that the parking brake assembly has been activated, it is assumed that the motor vehicle is already at standstill. As a result, monitoring of the vehicle speed can be dispensed with. However, to ensure that the driver has not accidentally activated the parking brake assembly while the vehicle is moving, or in order to initiate an emergency braking process, the vehicle speed is alternatively or at least additionally monitored to establish that the driver is at standstill. At the same time, or preferably directly afterwards, in a step b), the parking brake assembly is monitored for activation. In particular, in this case, an activation signal of the parking brake assembly is monitored in order to detect an activation of the parking brake assembly rapidly and reliably. In a following step c), if standstill of the motor vehicle has been detected in step a) and an activation of the parking brake assembly has been detected in step b), the braking boost set by the brake booster is reduced.

According to a preferred development of the disclosure, it is provided that the activation of the parking brake assembly is determined as a function of an operating state of an electric actuator of the parking brake assembly which is designed to generate a locking brake force of the parking brake assembly. In particular, it is provided that an operating current of the actuator is monitored. With increasing braking force or clamping force, the operating current of the actuator increases. By monitoring the operating current it can therefore be determined in a simple manner whether the parking brake assembly is actually generating a locking force or parking brake force. The braking boost is therefore reduced, in particular, only when it is determined that not only has the parking brake assembly been activated but the activation actually results in a braking force which acts on the wheel brake and is sufficient, in particular, for the parking brake function. A safe operation of the brake booster, which prevents, in particular, premature reduction of the braking boost, is thereby ensured. In addition, it is preferably provided that the braking boost is completely canceled in step c). It is thereby achieved that the brake booster as a whole is deactivated and its energy consumption is reduced to a minimum. In particular, the brake booster no longer absorbs any electrical energy after the braking boost has been reduced. The maximum possible energy saving is thereby achieved. At the same time, the hydraulic pressure in the braking system is limited to that which the driver himself can feed into the braking system by actuating the brake actuation device without the brake booster, consequently ensuring improved component protection.

It is further preferably provided that the braking boost is reduced only when it is determined that a drive assembly, in particular an internal combustion engine, of the motor vehicle, is switched off. This has, in particular, the advantage that the accustomed behavior of a vacuum brake booster, which can no longer provide hydraulic assistance through lack of vacuum generation only after the internal combustion engine has been switched off, is established. The braking system therefore behaves, from the driver's point of view, in exactly the same way as a conventional braking system with a vacuum brake booster.

It is further preferably provided that the braking boost is reduced only if the activation of the parking brake is detected beyond a predefinable time period. In particular, the braking boost is reduced only if not only the activation, but the actual generation of the locking force of the parking brake assembly, is detected beyond the predefinable time period. It is thereby achieved that a distinction is made between an actual parking brake process and an assisting braking process of the parking brake, as occurs briefly, or can occur, for example, while the vehicle is stationary in start-stop situations, if the motor vehicle has corresponding brake boosting. In particular with vehicle holding assistance devices, which hold the motor vehicle at standstill in an automated manner—for example, if the vehicle comes to a standstill on a gradient—it is thereby achieved that the braking boost remains in operation because a further braking action by the driver can be assumed. The time period is selected appropriately in such a way that a brief assisting braking process can be distinguished from an actual parking brake process.

It is further advantageously provided that even if the braking boost is reduced in step c), a hydraulic pressure for generating or increasing a braking force of the wheel brake is generated in dependence on an actuation of the brake actuation device. It is thereby ensured that, despite a reduction of the braking boost, the driver can generate or increase a braking force at the wheel brake by actuating the brake actuation device. For this purpose, valves in the hydraulic portion of the braking system are preferably switched in such a way that, upon actuating the brake actuation device, the driver can generate a hydraulic pressure in the hydraulic system which acts directly on one or more of the wheel brakes of the vehicle.

The device according to the disclosure is distinguished in that it is purpose-designed to carry out the method according to the disclosure when used as intended. The aforementioned advantages are thereby achieved.

The braking system according to the disclosure is distinguished by the device according to the disclosure. The aforementioned advantages are also thereby achieved.

It is provided, in particular, that the parking brake has an electric, in particular electromechanical, actuator to operate the wheel brake. Preferably, the parking brake assembly is integrated in the existing wheel brake in such a way that the electromechanical actuator acts on the brake piston on which the hydraulic pressure of the braking system also otherwise acts.

BRIEF DESCRIPTION OF THE DRAWINGS

Further advantages and preferred features and combinations of features are apparent from the preceding description and from the claims. The disclosure will be explained in more detail below with reference to the drawings. For this purpose:

DETAILED DESCRIPTION

Figure 1:
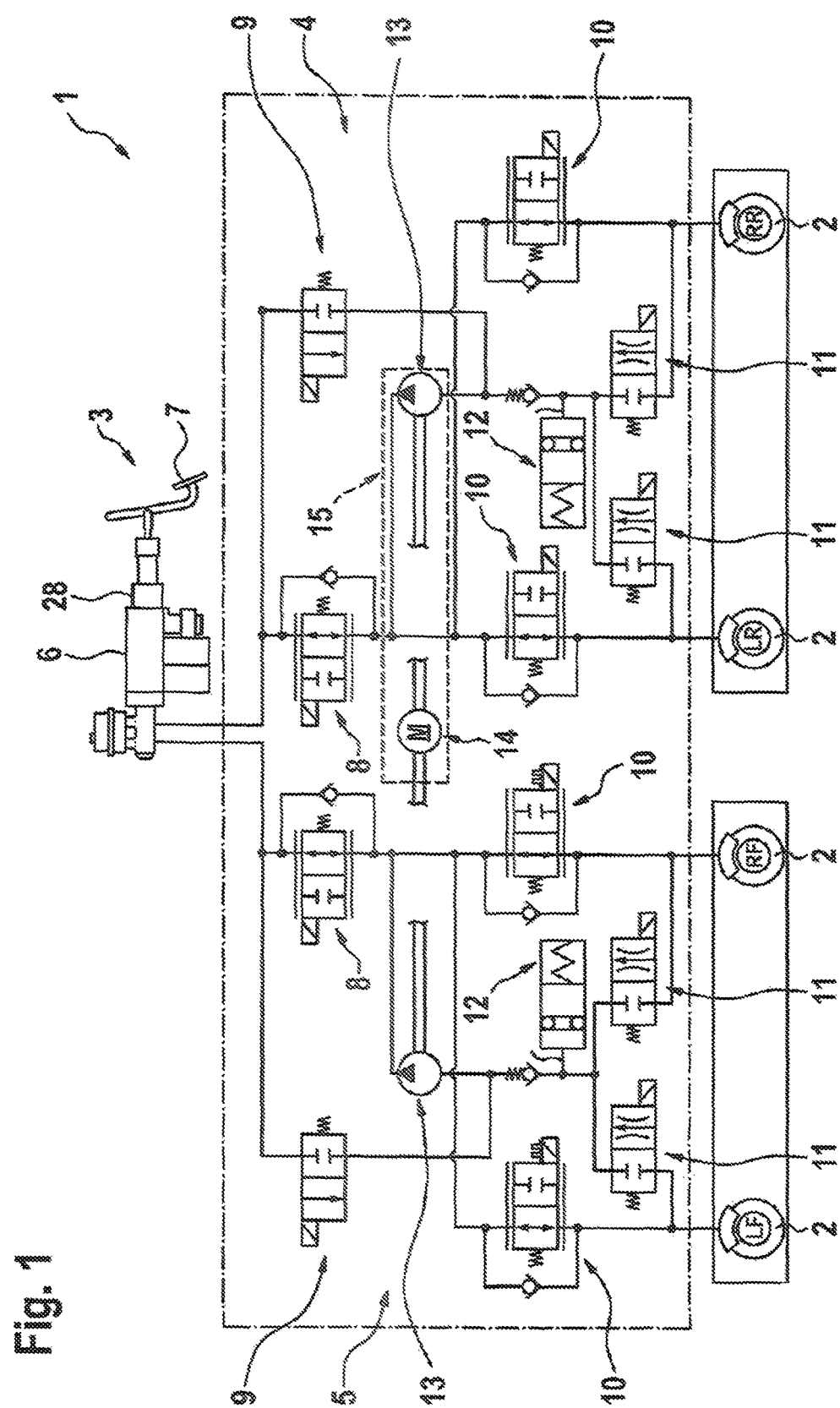
FIG. 1 shows a braking system of a motor vehicle in a simplified representation.

FIG. 1 shows in a simplified representation a braking system 1 for a motor vehicle (not shown in detail). The braking system 1 comprises a plurality of wheel brakes 2 which can be actuated as service brakes by a driver of the motor vehicle by means of a brake actuation device 3. The wheel brakes 2 are designated by LR, RF, LF and RR, which explain their position or allocation on the motor vehicle, LR standing for left rear, RF for right front, LF for left front and RR for right rear. Two brake circuits 4 and 5 are formed between the brake pedal device 3 and the wheel brakes 2, the brake circuit 4 being assigned to the wheel brakes LF and RR and the brake circuit 5 to the wheel brakes LR and RF. The two brake circuits 4 and 5 are constructed identically, so that the structures of both brake circuits 4, 5 are explained in more detail below with reference to the brake circuit 4.

The brake circuit 4 is connected first to a brake master cylinder 6 of the brake pedal device 3, the brake pedal device 3 also including a brake pedal 7 actuable by the driver and an electric brake booster 28. The brake circuit 4 has a reversing valve 8 together with a high-pressure switching valve 9, which are connected in parallel to one another and follow the brake master cylinder 6. The reversing valve 8 is configured to be currentlessly open and allows the hydraulic medium of the brake circuit, that is, the brake fluid, to flow in both directions. The high-pressure switching valve 9 is configured to be currentlessly closed and in the energized state allows brake fluid to flow in the direction of the wheel brakes 2. The reversing valve 8 is further connected to the two wheel brakes 2, an inlet valve 10, which is configured to be currentlessly open in both directions, being interposed in each case. Also associated with each wheel brake 2 of the brake circuit 4 is a respective outlet valve 11, which is configured to be currentlessly closed. A hydraulic accumulator 12 is connected downstream of the outlet valves 11. The outlet valves 11 are also connected on the outlet side to a suction side of a pump 13, which is connected on the pressure side to the brake circuit 4 between the reversing valve 8 and the inlet valves 10. The pump 13 is coupled mechanically to an electric motor 14, the pump 13 and the electric motor 14 together forming a pressure generator 15 of the braking system 1. It is provided that the electric motor 14 is associated with the pumps 13 of both brake circuits 4 and 5. Alternatively, it may also be provided that each brake circuit 4, 5 has its own electric motor 14. A pressure sensor P/U which detects the hydraulic pressure in the brake master cylinder 6 is advantageously associated with the brake master cylinder 6. In particular, the hydraulic pressure is monitored continuously by means of the pressure sensor in order to determine whether, for example, a leakage of the braking system 1 has occurred, in particular in one of the two brake circuits 4, 5. Thus, for example, an unexpected pressure drop caused by an undesired leakage can thereby be detected and communicated to the driver, for example by displaying a warning message.

The brake booster 28 is integrated as an electric brake booster in the brake actuation device 3 and is associated with the brake master cylinder, and in particular is connected to the input of the brake master cylinder 6. According to an alternative exemplary embodiment it is also possible to use the pressure generator 15 as an electric or electrically operated brake booster 28, in order to increase the hydraulic pressure in the respective brake circuit 4, 5 independently of a brake pedal actuation.

If the two reversing valves 8 of the brake circuits 4, 5 are closed, the hydraulic pressure remains blocked or maintained in the downstream section of the brake circuit 4, 5, that is, between the reversing valves and the wheel brakes 2, even when the brake pedal 7 is no longer depressed by the driver.

Figure 2:
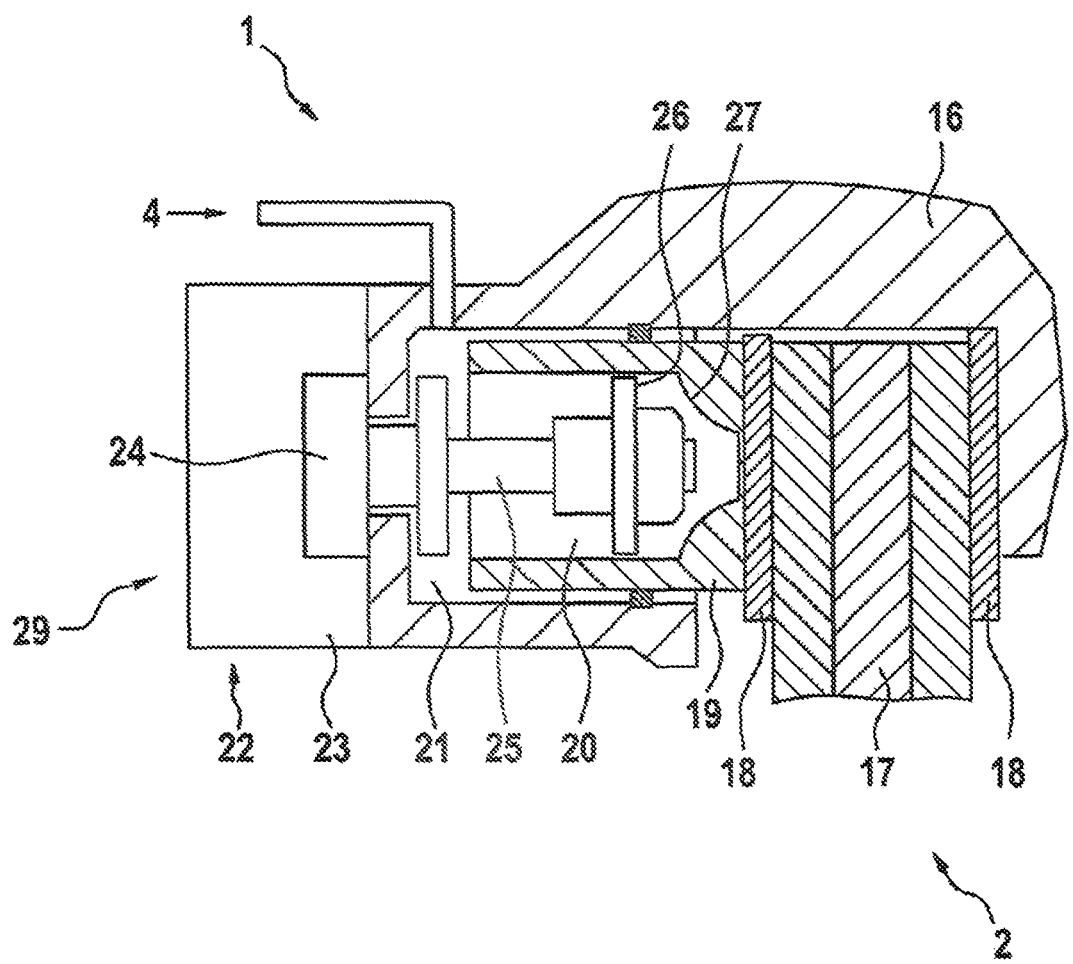
FIG. 2 shows a wheel brake of the braking system in a simplified longitudinal sectional representation and FIG. 3 is a flow diagram for clarifying an advantageous method for operating the braking system.

FIG. 2 shows in a simplified sectional representation the configuration of the wheel brakes 2. The respective wheel brake 2 has a brake caliper 16 which extends around the side faces of a brake disk 17 which is connected non-rotatably to a wheel of the motor vehicle. A brake pad or brake lining 18 of the wheel brake 2 is associated with each side face of the brake disk 17. One of the brake pads 18 is configured or arranged at an end face of a brake piston 19 mounted displaceably in the brake caliper 16.

The brake piston 19 has in longitudinal section a bowl-shaped structure, so that it forms, together with a receptacle 21 in which the brake piston 19 is mounted displaceably, a cavity 20. The cavity 20 is connected fluidically to the inlet valve 10, so that, when the inlet valve 10 and the reversing valve 8 are open and the brake pedal 7 is actuated, the hydraulic pressure acts on the brake piston 19 in order to displace the brake piston 19 towards the brake disk 17, whereby the brake disk 17 is braced or clamped between the brake pads 18 of the wheel brake 2. Alternatively, the hydraulic pressure can be generated in an automated manner in the brake circuit 4 by closing the reversing valve 8 and activating the pressure generator 15. This is predominantly the case if the driver operates a button or switch for actuating a parking brake assembly 29 or an emergency brake while driving, or if the vehicle is automatically held hydraulically (AVH).

An electromechanical actuator 22 of the parking brake assembly 29, comprising an electric motor 23 and a transmission 24 operatively connected thereto, is also associated with the brake piston 19. The transmission is in the form of a spindle gear, comprising a spindle 25 connected non-rotatably to the electric motor 23 and a spindle nut 26 mounted in a longitudinally displaceable manner on the spindle 25 in the brake piston 19. When the spindle is driven by the electric motor 23, the spindle nut 26 is thereby displaced longitudinally in the brake piston 19. The spindle nut 26 can be displaced so far by the rotary motion of the spindle 25 that it impinges on an axial stop 27 of the brake piston 19 in the chamber 20, whereby the brake piston 19 is entrained by the spindle nut 26. Through activation of the actuator 22, therefore, a force can also be applied to the brake piston 19 to displace said brake piston 19, which force is superimposed, or can be superimposed, on the force exerted by the hydraulic pressure.

Figure 3:
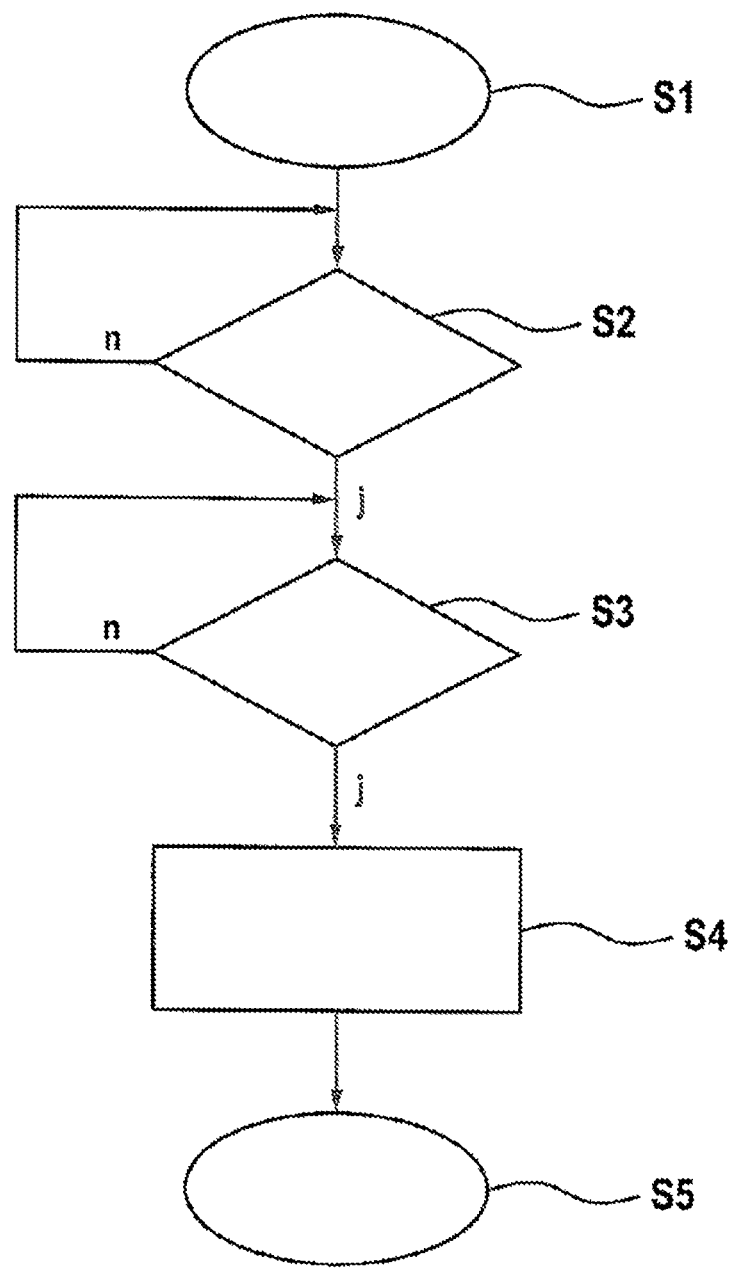

An advantageous method for operating the braking system 1, executed by a control device (not shown) of the braking system 1, will now be explained with reference to FIG. 3. It is achieved by means of the advantageous method that components of the hydraulic portion of the braking system 1 are protected from prolonged high stress, and that a saving, especially of electrical energy, is ensured. The braking system 1 is thereby made efficient and ensures a long service life.

In a first step S1 the braking system 1 is put into operation. In the following step S2 the motor vehicle is monitored to determine whether it is at standstill or in motion. For this purpose, the actual driving speed of the motor vehicle, for example, is monitored. In particular, a speed signal which is present in the motor vehicle in any case and is made available, for example, by a control device of the motor vehicle or, for example, by an ESP system, is detected. Only when standstill of the motor vehicle has been detected (j), in a following step S3 the electromechanical actuator 22 of the parking brake integrated in the wheel brake 2 is monitored to determine whether the parking brake has been activated and, in particular, is generating a braking force between the brake pads 18 and the brake disk 17. It is preferably checked whether the braking force generated is sufficient to hold the vehicle firmly on the current gradient.

Only when it has also been determined that the parking brake has been activated and a braking force has been generated (j), is the braking boost reduced in a following step S4, said boost being made available by the pressure generator 15 acting as a brake booster in the form of an increased hydraulic pressure in the respective brake circuit 4 or 5. As a result, only the hydraulic pressure generated by the driver himself by actuation of the brake pedal 7 now acts on the respective wheel brake 3.

If, in addition, the ignition of the motor vehicle 1 is then switched off, the method is ended in the following step S5. Because the parking brake is configured, as is usual, to be self-locking, it also ensures secure holding of the motor vehicle after the ignition of the motor vehicle 1 has been switched off.

Because the reduction of the braking boost takes place in dependence on the operating state of the parking brake assembly 29, it is ensured that the parking brake engages securely before of the braking boost is reduced, so that the driver always has control over the motor vehicle and the motor vehicle is held securely at standstill. After the standstill of the motor vehicle has been detected in step S2 and the activation of the parking brake assembly has been detected in step S3, the brake circuits 4, 5, or the valves thereof, are preferably switched in such a way that the driver continues to be able to exert a braking force hydraulically on the respective wheel brakes 2 by actuating the brake pedal 7. The driver is thereby able to increase the braking force if needed, at least as far as is possible for him Furthermore, it is provided according to a further exemplary embodiment that the actuation of the parking brake assembly 29 in step S3 is registered, or confirmed, only when the activation, in particular of the locking brake force set by the parking brake assembly 29, has been maintained beyond a predefinable time period. It is thereby ensured that the parking brake function has not been activated, for example, on the basis of a vehicle holding assistance function or an automatic start-stop function, and will be deactivated again after a short time. It is further advantageously provided that the braking boost is canceled only if it has additionally been determined that a drive assembly of the motor vehicle, in particular an internal combustion engine of the motor vehicle, has been disconnected or switched off. An overall behavior of the braking system 1 which corresponds to that of a braking system 1 with a vacuum brake booster is thereby provided for the driver. In this case, too, the driver does not experience a "hard brake pedal" after the internal combustion engine has been switched off, because brake boosting can no longer take place.

What is claimed is:

1. A method for operating a braking system of a motor vehicle, the braking system including at least one hydraulically actuable wheel brake, a brake actuation device for hydraulically actuating the wheel brake, an electric brake booster for setting a predefinable hydraulic braking boost, and at least one parking brake assembly, the method comprising:
    monitoring the motor vehicle to detect standstill;
    monitoring the parking brake assembly to detect an activation thereof; and
    reducing a braking boost set by the brake booster if the standstill of the motor vehicle has been detected and the activation of the parking brake assembly has been detected,
    wherein the activation of the parking brake assembly is determined in dependence on an operating state of an electric actuator of the parking brake assembly, the actuator configured to generate a locking brake force of the parking brake assembly.

2. The method according to claim 1, wherein the braking boost is completely canceled if the standstill of the motor vehicle has been detected and the activation of the parking brake assembly has been detected.

3. The method according to claim 1, wherein the braking boost is reduced only if it is detected that a drive assembly of the motor vehicle is switched off.

4. The method according to claim 1, wherein the braking boost is reduced only if the activation of the parking brake assembly is detected continuously for a predefined time period.

5. The method according to claim 1, wherein, even if the braking boost is reduced, a hydraulic pressure configured to generate or increase a braking force of the wheel brake is generated in dependence on an actuation of the brake actuation device.

6. The method according to claim 3, wherein the drive assembly is an internal combustion engine of the motor vehicle.

7. A control device for operating a braking system of a motor vehicle, the braking system including at least one hydraulically actuable wheel brake, a brake actuation device for hydraulically actuating the wheel brake, an electric brake booster for setting a predefinable hydraulic braking boost, and a parking brake assembly having an electric actuator associated with the wheel brake and separately actuable from the hydraulic actuation of the wheel brake, the control device specifically-configured to:
    monitor the motor vehicle to detect standstill;
    monitor the parking brake assembly to detect an activation of the parking brake assembly via the electric actuator; and
    reduce a braking boost set by the brake booster if the standstill of the motor vehicle has been detected and the activation of the parking brake assembly has been detected.

8. A braking system for a motor vehicle, comprising:
    at least one hydraulically actuable wheel brake;
    a brake actuation device configured to hydraulically actuate the wheel brake;
    an electric brake booster configured to set a predefinable hydraulic braking boost;
    a parking brake assembly integrated with a housing of the wheel brake and configured to separately actuate the wheel brake; and
    a control device configured to carry out a method for operating the braking system, the control device specifically-configured to:
        monitor the motor vehicle to detect standstill,
        monitor the parking brake assembly to detect an activation thereof, and
        reduce a braking boost set by the brake booster if the standstill of the motor vehicle has been detected and the activation of the parking brake assembly has been detected.

9. The braking system according to claim 8, wherein the parking brake assembly has an electric-motor driven actuator configured to actuate the wheel brake.

* * * * *